United States Patent [19]
Figliuzzi

[11] Patent Number: 5,365,434
[45] Date of Patent: Nov. 15, 1994

[54] BOOK ENHANCER

[75] Inventor: Vincent D. Figliuzzi, fort Atkinson, Wis.

[73] Assignees: Carolyn E. Carlson, Chicago, Ill.; Linda J. Figliuzzi, Markesan, Wis.

[21] Appl. No.: 70,911

[22] Filed: Jun. 4, 1993

[51] Int. Cl.$^5$ .......................... G06F 3/14; G06F 15/40
[52] U.S. Cl. ................................................ 364/419.13
[58] Field of Search ............... 364/419.13, 419.12, 364/419.11, 419.14, 419.16, 419.18, 419.19, 419.03; 395/927, 934; 434/307, 323

[56] References Cited

U.S. PATENT DOCUMENTS

| | | |
|---|---|---|
| 3,932,859 | 1/1976 | Krriakides et al. |
| 3,996,671 | 12/1976 | Foster . |
| 4,122,533 | 10/1978 | Kubinak . |
| 4,159,536 | 6/1979 | Kehoe et al. |
| 4,355,370 | 10/1982 | Yanagiuchi . |
| 4,373,194 | 2/1983 | Demke et al. |
| 4,384,329 | 5/1983 | Rosenbaum et al. |
| 4,406,626 | 9/1983 | Anderson et al. ............. 364/419.11 |
| 4,412,305 | 10/1983 | Yoshida . |
| 4,424,575 | 1/1984 | Clarke et al. |
| 4,445,196 | 4/1984 | Gonet . |
| 4,579,533 | 4/1986 | Anderson et al. ............. 364/419.03 |
| 4,633,430 | 12/1986 | Cooper ................. 364/900 |
| 4,688,192 | 8/1987 | Yoshimura et al. |
| 4,710,877 | 12/1987 | Ahmed . |
| 4,782,464 | 11/1988 | Gray et al. |
| 4,812,966 | 3/1989 | Takagi et al. |
| 4,968,257 | 11/1990 | Yalen et al. |
| 4,985,697 | 1/1991 | Boulton ........................ 395/927 |
| 5,122,972 | 6/1992 | Richards et al. .......... 395/157 |

*Primary Examiner*—Donald E. McElheny, Jr.
*Attorney, Agent, or Firm*—Hill, Steadman & Simpson

[57] ABSTRACT

A system is provided for inputting of a portion of a word or problem on a specific page of a book for assisting the reader of the book in understanding the term as it is being used in the book. An interchangeable memory is inserted into the system corresponding to the book which is being read. An interchangeable or permanent system memory is further provided for storing commonly used words or problems with respect to the subject matter of the book therein. The system operates by inputting a page number and a portion of a word or problem in the book into the system, and the system matches this portion on the specific page with a word or problem in its memories. The word and definition may then be output by the system so that the reader understands the word or problem as it is being used. In addition, alternate definitions of the word or similar problems to the problem which is output may be provided to the reader for further aid in comprehension.

26 Claims, 4 Drawing Sheets

BOOK ENHANCER

BACKGROUND OF THE INVENTION

The present invention generally relates to a system for retrieving of text from a book or the like. More specifically, the invention relates to retrieval of data from a specific book and subsequent display of a definition or explanation of the data to a user. The invention, therefore, further relates to a pedagogical device particularly useful as an automated tutor.

Of course, books are read by individuals throughout the world. However, frequently when a particular book is being read, words, phrases, or the like are identified which are not understood by the individual who is reading the book. Therefore, the individual must reference a dictionary, reference book, another individual or the like for assistance in determining the meaning and/or pronunciation of the particular word or phrase as it is being used in context within the book.

Electronic dictionaries are known for entering words and, in turn, displaying a definition or definitions of the word. Examples of such electronic dictionaries are known from U.S. Pat. Nos. 4,688,192 and 3,932,859.

U.S. Pat. No. 4,688,192 to Yoshimura et al. relates to an electronic dictionary comprising a dictionary memory which has multiple data memory locations identified by respective addresses. Upon entry of a word through an input device, the word stored in the dictionary memory is retrieved from the respective word-data memory location. The word stored in the word-data memory location of the search data memory location is displayed as a synonym or antonym of the word which has been entered through the input device. The word-data memory locations may be grouped into two vocabulary storage parts corresponding to two languages resulting in a dictionary which may be used to know the meaning of a word of one language via words of the other language.

U.S. Pat. No. 3,932,859 to Kyriakides et al. relates to an electronic dictionary having a keyboard with a plurality of keys. Upon entry of a word, a definition of the word may be displayed if the word and the definition are included as a part of the system.

The '192 and '859 patents, however, require storage of words and the meanings of each word stored. Therefore, a number of words are stored which potentially may never require interrogation to determine their meanings or may not be In the storage at all. Furthermore, such electronic dictionaries often do not account for archaic-type words, such as slang, technical terms, commonly used foreign words, and the like, which often require a specialized dictionary for reference.

A computer based teaching apparatus is also known from U.S. Pat. No. 4,968,257 which relates to a limited function, user-interactive teaching apparatus including a memory for storing a compilation of words and phrases to be used by the teaching apparatus. A pedagogical lesson database is also included having a plurality of substantially identical, limited-size, lesson frame data units. A display is used for displaying selected words and phrases which includes a movable indicator cursor or touch sensitive position indicator. A processor fetches selected words and/or phrases and provides them to the display in accordance with pointer data contained in each data unit. A voice synthesizer further provides tutorial instruction and operational directions and informs the user of the outcome of a completed exercise. A cartridge provides input data which includes a plurality of program units or lesson frames. A display, in response to execution of a lesson frame, may include a question followed by a plurality of suggested answers. The user moves the cursor under the answer believed to be correct and depresses the select button to indicate selection of the answer to the processor. The system, therefore, is strictly an interactive prompting of question and answer formats in the lesson frames for soliciting a response by the user of the system.

A need, therefore, exists for an improved system which provides an enhancement for a specific book being read to improve understanding thereof by the user.

SUMMARY OF THE INVENTION

The present invention generally relates to a system for assisting a user in his understanding of a book which is being read or studied and further for use as a learning aid. The system includes a first storage means for interchangeably receiving portions of the book for subsequent access by the user reading the book. A second storage means stores a plurality of frequently used terms which vary with the subject of the book. The system further includes means for inputting a page number and a segment of one portion of the book. A matching means searches the segment on the input page number with the portions and the terms in the first storage means and the second storage means, respectively, resulting in an identification wherein means are provided for outputting the identification.

In an embodiment, the output means is a video display screen.

In another embodiment, the output means may be provided by voice synthesis.

In yet another embodiment, the input means is responsive to the voice of the user by using voice recognition circuitry.

In a still further embodiment of the invention, the input means may be a track ball or a keyboard, and the output means may be a printer.

The present invention further relates to a system for assisting in reading a book having a first memory for storing a compilation of words and/or phrases in the book wherein the first memory matched to the book is replaceable. A second memory stores other words exclusive of the words and/or phrases in the first memory. An input means is provided for inputting a page number and portion of a word to be searched, and a processor matches the page number and the portion of the searched word with a word stored in the first memory or the second memory. An output means outputs at least a definition and pronunciation of the searched word.

In an embodiment, the portion of the word may be a portion of a mathematical problem.

In another embodiment, the output means may further output similar problems to the mathematical problem in the book.

In another embodiment of the invention, a method is disclosed for providing a definition of a portion of a book being read by a user by: inputting an identifier corresponding to a portion of the book; storing definitions of words; matching the identifier with at least one of the stored definitions; and outputting the matched definition or definitions.

In an embodiment, the method further provides an indicator of the page in the book where the last matching occurred.

It is, therefore, an object of the present invention to provide a system for assisting in understanding of a book being read by an individual.

Another advantage of the present invention is to provide a system which is simple to use for calling up definitions of words as they are used in context within a specific book.

A still further advantage of the present invention is to provide a system for outputting of alternative definitions of words or similar problems to a problem in the book.

Yet another advantage of the present invention is to provide a system which stores words and definitions therefor only for words which are included in a particular book thereby eliminating the need to store unnecessary words and definitions.

Moreover, an advantage of the present invention is to provide a system which provides a simple means for inputting data and for further matching stored information with the input data which may then output the matched information as well as other information relating thereto for use by an individual reading a book.

A further advantage of the present invention is to provide a system which includes all words and phrases which are used in a particular book including slang, technical words, foreign phrases and the like which may typically not be found in any one single dictionary.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention generally relates to a system for enhancing understanding of particular text when a user is reading a book, for example. In addition, a display or a subsequent printout of interactive problem solving or word usage with alternate definitions may be performed by the system. The present invention, therefore, further relates to a system in the form of a pedagogical device which may be implemented by an individual for use as an automated tutor.

Figure 1:
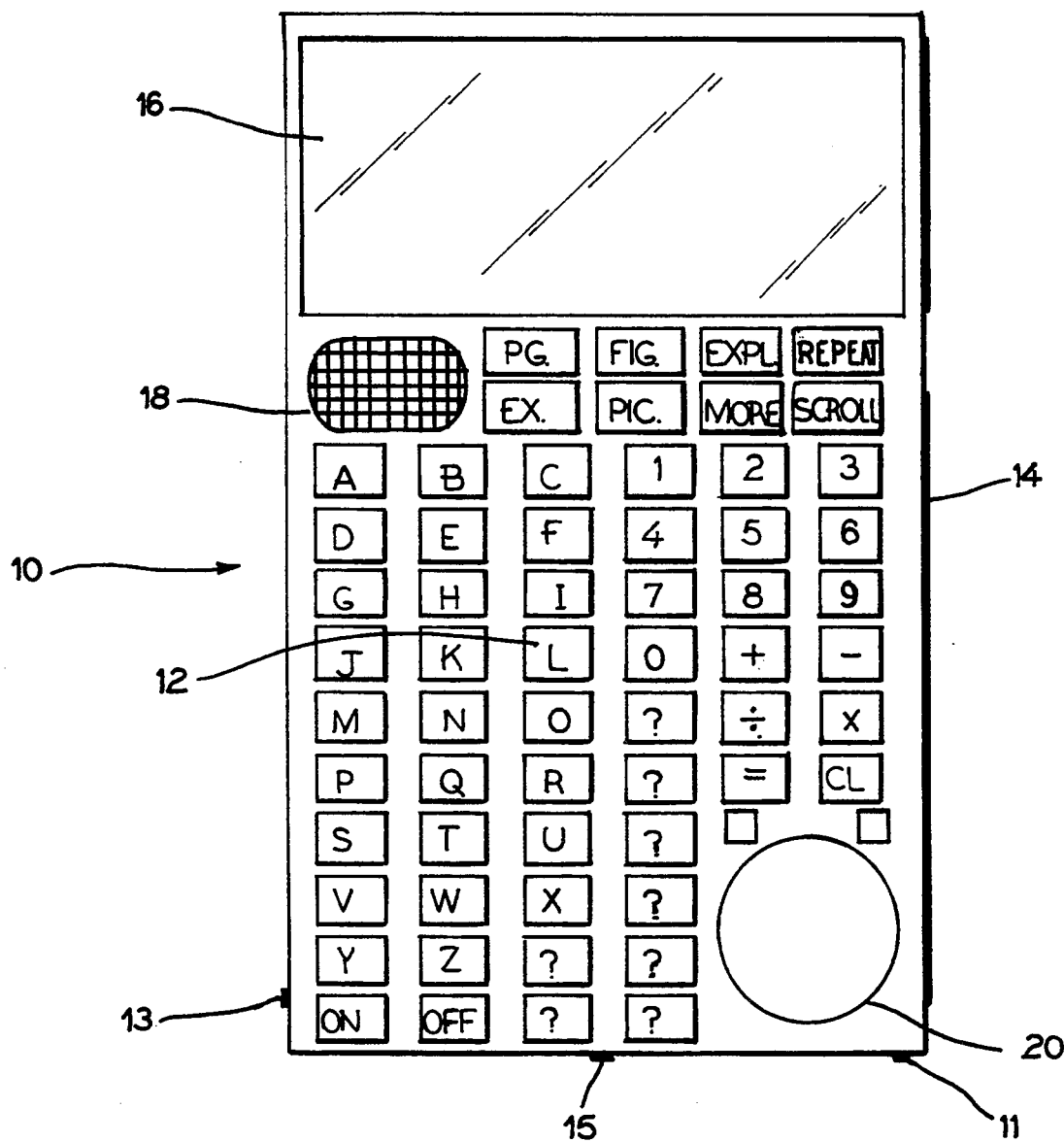
FIG. 1 illustrates a general perspective view of an embodiment of the system of the present invention.

Referring now to FIG. 1, a system 10 is generally shown. The system 10 includes an integral keyboard, generally designated at 12 having a plurality of keys arranged in rows and columns. The keys may be the letters of the alphabet, as well as numerical keys and/or function keys, such as mathematical functions. Other designated function keys may be provided, such as page (PG), example (EX), figure (FIG), picture (PIC), explanation (EXPL), more (MORE), repeat (REPEAT) and scroll (SCROLL), for example. The functions performed by each of these designated function keys will be later described.

The system 10 further includes an input port 14 for receiving a particular disk, memory card, cartridge or the like. A screen 16 displays data being input to the system 10 as well as displaying of outputs after searching for the input. Simultaneously with the display 16, a voice synthesizer in the system 10 via a speaker/announcer 18 announces that which is being displayed or input to the system 10.

A number of options are available for input of data rather than using the keyboard 12 of the system 10. The speaker/announcer 18 of the system 10 also includes voice recognition circuitry such that the user may orally spell the particular word in question to input the word. Then, the system 10 searches and identifies the definition of the word or the entirety of the problem, formula, or the like.

Another option for inputting data is connection of a light pen (not shown) which may be brushed on the page of the book being read. The page number may first be identified by brushing the light pen thereover, and then the word or problem may be "read" by the light pen. The word and/or definition may then be displayed on the screen 16 of the system 10.

An additional option for input of data, such as a particular word or portion of a word, may be the insertion of a page number using the keyboard 12 of the system 10. Then, the track ball 20 may manipulate cursors on the screen 16 to locate the word or problem in question. Once the word or problem is identified, the user may initiate the search for the definition or answer to the problem thereof by the appropriate command. Of course, other input options are available for the system 10, such as a mouse, a touch pad screen, or the like. Input of the appropriate word or problem using such devices is well known to those skilled in the art.

Of course, too, numerical or alphabetical data may be displayed on the screen 16 of the system 10 for moving a cursor operated by the track ball 20, mouse or the like to the displayed number or the displayed alphabetical data. Once the appropriate page number, for example, is identified on the screen 16 by moving the cursor, the screen 16 may display the words from that page of interest which have been stored for a particular book.

The designated keys, such as page, example, figure, etc., perform the specific function designated on the key. For example, the page key "PG" advances the display 16 of the system 10 to the next page. The example key "EX" provides an example of the particular problem being displayed. For instance, if a mathematical problem is displayed, another example of such a problem may be output to the display 16 as desired by pressing of this key.

Further designated keys includes picture "PIC" and figure "FIG" which can be implemented to designate a particular picture or figure on a particular page, for example. Other methods for identifying pictures and figures may, of course, be implemented. One method is by entering the page number of the page, either orally or using the keyboard. After the page is identified and displayed on the display 16, a segment of the display 16, such as "U-L" (upper-left) may be identified at which the figure is located. Other designations may be implemented, such as "U-R, U-M, L-R, L-L, M--R or M-L" where "U" is upper, "M" is middle, "L" is lower or left and "R" is right. Of course, other figure or picture identifying methods for designating the same may be implemented.

Finally, the designated key "EXPL" is used to explain or provide further explanation for a particular definition, for example; "MORE" provides additional definitions, for example, or may display any other information stored not already displayed for the user; "REPEAT" repeats information last stored; and "SCROLL" moves the display continuously line-by-line when pressed.

Figure 2:
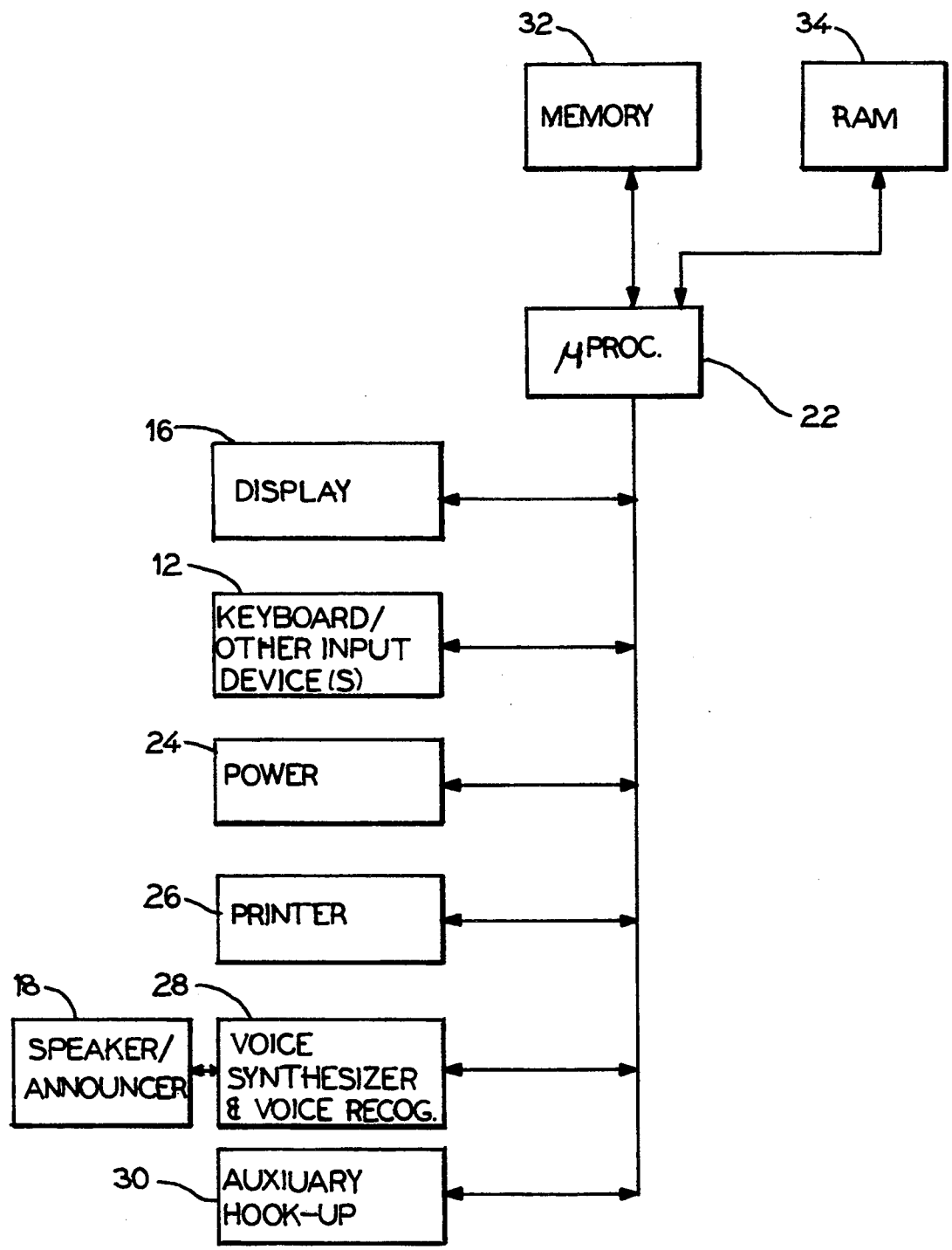
FIG. 2 illustrates a block diagram of the components for operation of the system of the present invention illustrated in FIG. 1.

Referring now to FIG. 2, the system 10 of FIG. 1 is generally illustrated in a black box diagram format. The keyboard 12 and/or other input devices, such as a light pen, a mouse, a touch pad, or the like, is connected to a microprocessor 22 for subsequent processing of the input. A power source 24 is further provided for operation of the system 10 providing either an AC and/or a DC source of power.

Furthermore, as previously discussed with reference to FIG. 1, a display 16 may be integrally formed with the system 10 or may be separately connected via a jack 11. In addition, an auxiliary device, such as a printer 26, may be connected to the system 10. Furthermore, the combination speaker/announcer 18 may be provided for output of oral commands and/or instructions or the like. The speaker/announcer 18 is connected to internal voice recognition circuitry and voice synthesizing components 28, respectively. As a result, the speaker/announcer 18 may be implemented either for recognition of inputs to the speaker/announcer 18 or synthesizing of voice outputs to the speaker/announcer 18. Auxiliary hookup jacks 11, 13 and 15 are further available for recharging of the power source, an earphone connection, an auxiliary display or other input/output device as required for operation of the system 10.

The microprocessor 22 is further connected to memory devices 32 and 34. The memory device 32 may be, for example, an interchangeable ROM, such as a CD-ROM, which includes the contents of a book, for example. The memory device 32 may also further include the corresponding definitions of each word as it is being used in context of the book or corresponding problems in the book. Furthermore, the second memory 34 may be, for example, a ROM which includes frequently used words as well as words that are exclusive of the words included in the definitions found in the memory 32 for a particular book.

Therefore, the stored book in the memory 32 does not require that every word therein be stored along with its definition. That is, certain words, such as conjunctions (and, but, nor, or, etc.) may be included in the dictionary of the second memory 34 as well as, for example, prepositions (of, to, for, in, on, etc.). Of course, the dictionary may be varied from system to system depending on the preferred use of the particular system. For example, a system which may be used primarily for solving of mathematical problems may include in the second memory 34 definitions for "sine", "cosine", "tangent", "integration", "differentiation", or other like commonly used mathematical terms. Of course, specific memories for chemistry, biology, music and the like may be implemented as well.

Figure 3A:
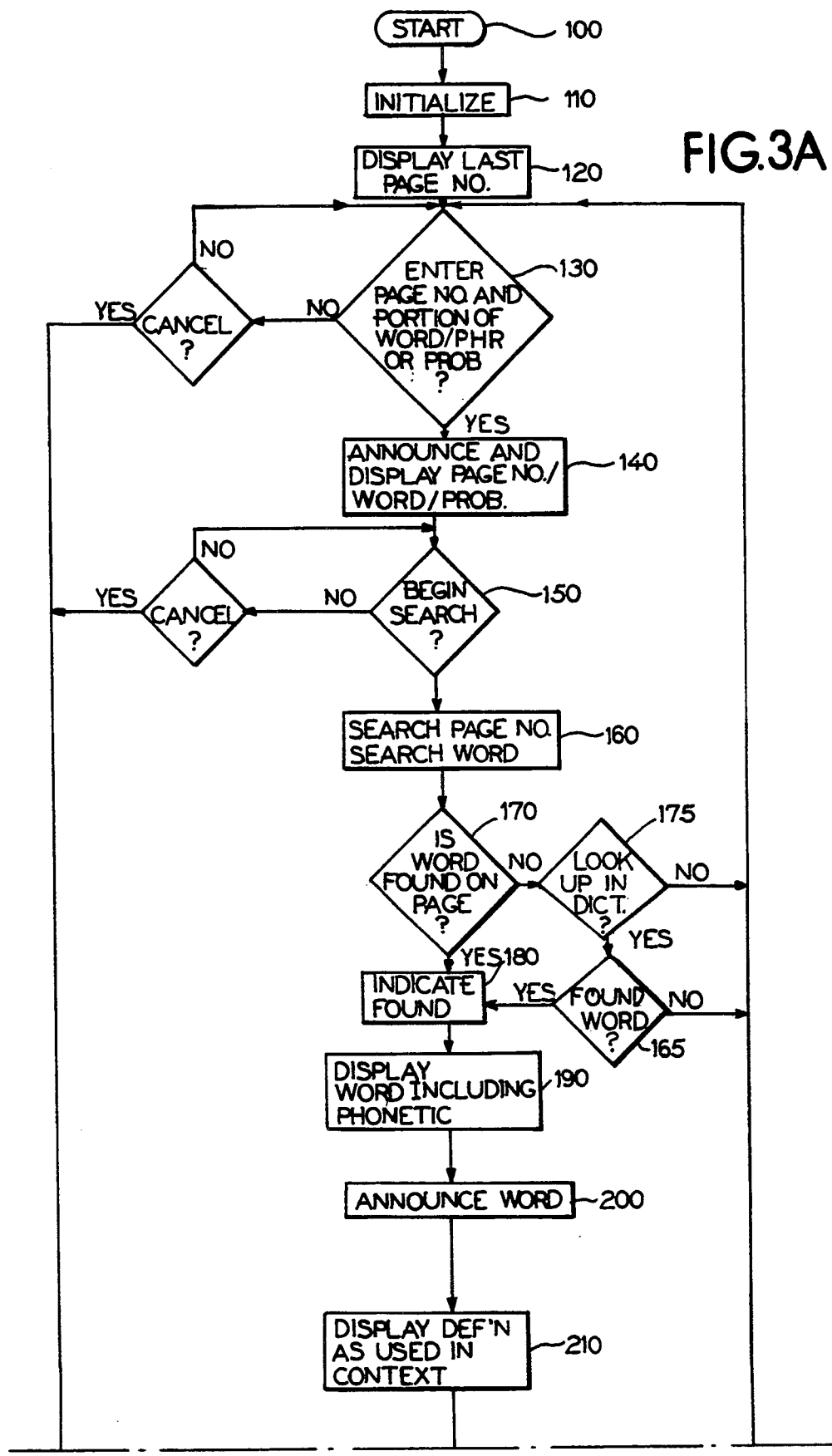
FIGS. 3A and 3B illustrate a flowchart for operation of the system illustrated in FIGS. 1 and 2.
Figure 3B:
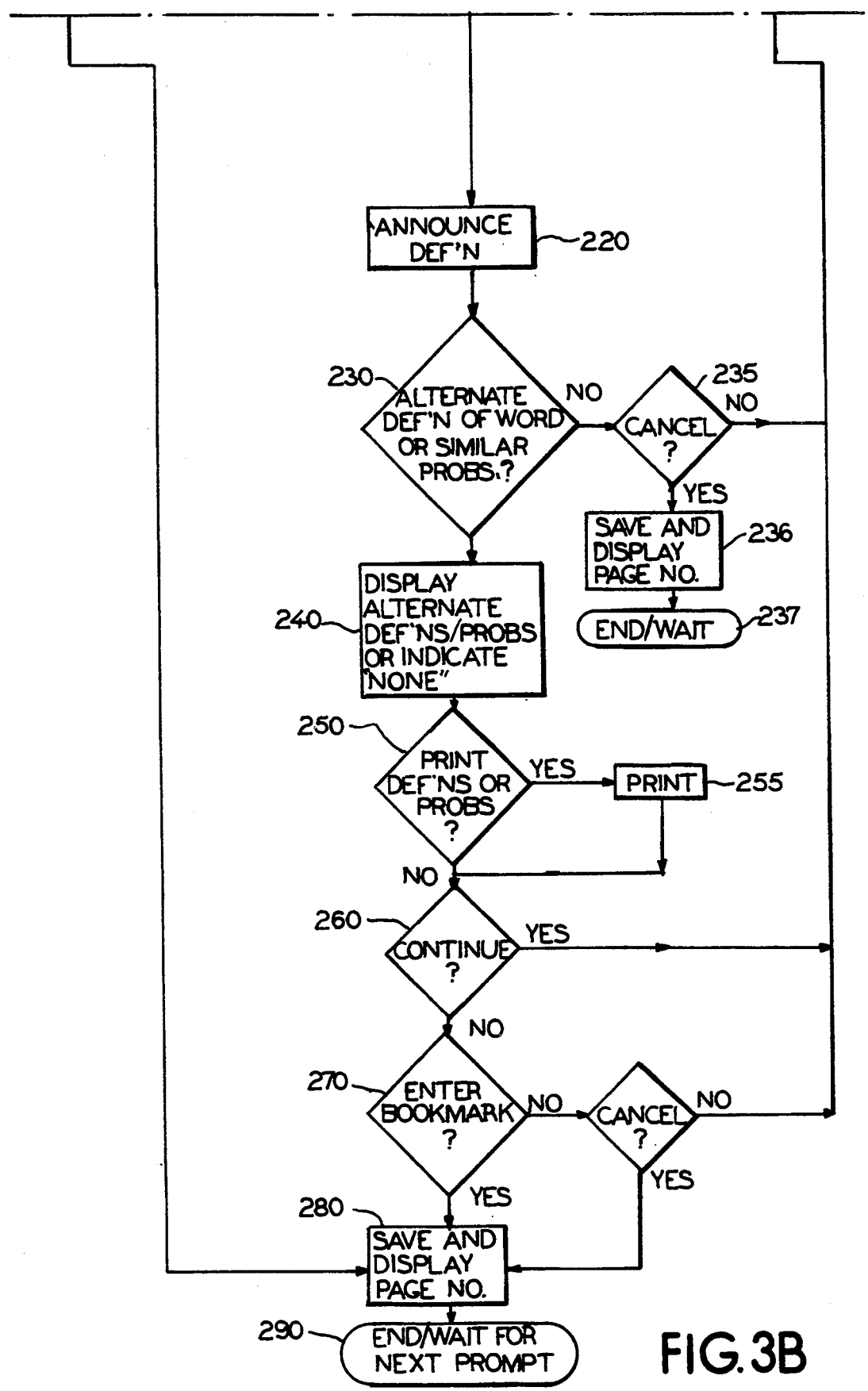

In use, the system 10 may function with reference to the flowchart illustrated in FIGS. 3A and 3B. Referring thereto, the system 10 may first be started at 100 and initialized at 110 by insertion of, for example, a disk including specific words from a text of a book which is to be read by a user. The book itself does not make up a part of the present invention and may be provided in hard copy form to a user. The book may be bought at a store, for instance, or may be borrowed from a library or may be otherwise obtained, such as at a school which the user is attending.

The system 10 may include a "bookmark" function such that when the user stops reading the book at a particular point therein, the user designates the point at which he stops, and that point is displayed on the screen of the system after initialization is performed (at step 120) when the book is again picked-up for reading by the user.

To use the system 10 of the present invention, the hard copy of the book is read by the user, and reading continues until a particular word, phrase, problem or the like is identified which the user does not understand. When this occurs, the user may enter the page number and portion of the word, phrase or problem which is not understood as at step 130 onto the keyboard or other input device of the system. For example, if on page six of the book, the reader does not understand the meaning of the word "patent", the user may key in the numeral "6" followed by, for example, the first three letters "pat" into the system.

Of course, the page number and any portion of a word, phrase or problem may be entered and the system then determines the words on that page which correspond to the input. Furthermore, the word or portion of the word alone may be entered without the page number to locate the word at any point in the text of the book.

As the input is being entered, the system 10 may announce and may display the page number and word, phrase or problem simultaneously at step 140. If the proper page number and letters are entered, then the user is prompted to begin the search or may otherwise cancel the search at step 150. The system 10 then begins searching of the page number and the portion of the word entered at step 160.

At step 170, the system 10 determines if the particular segment of the word is found on the page. If not, at step 175, the particular segment is searched for in the dictionary of commonly used words or other memory of the system 10. However, all words which are not in the dictionary are included on the particular disk entered into the system 10.

After the word is found through the normal search or after the dictionary search, the system 10 announces and displays that the word is found at step 180. The only instance in which the word may not be found by the system 10 is if the word has not been properly entered by the user (either the page number and/or word, phrase or problem). The system 10 then returns the user back to step 130 for entry of the page number and portion of the word, phrase, problem or the like.

Following an indication that the word has been found, the system 10 at step 190 displays the word including its phonetic pronunciation, announces the word at step 200 and displays the definition of the word as it is being used in the context of the book at step 210. Simultaneously, the definition and its use in context is announced at step 220.

The user may then indicate whether he desires to display or otherwise output alternate definitions of the word or similar problems to the one being read in the book at step 230. If not, the user is given the option of cancelling and returning to entry of a new word or saving and displaying the page number to return to the point in the book in which the reader stopped reading. The system 10 may then be exited from or may enter into a waiting state at step 237 which waits for a subsequent entry.

Following a request for alternate definitions of the word or similar problems at step 230, the system 10 displays alternate definitions or problems or indicates that "none" exist. The user is then given the option of printing of the definition and/or alternate definitions or problems at step 250. After printing or indicating that printing is or is not desired, the user may then optionally continue use of the system 10 at step 260.

If continuing use is desired, the user returns to step 130 for entry of a page number and portion of a word, phrase, problem or the like. If the user elects not to continue, the system 10 prompts the user for entry of the bookmark function at step 270. The user, however, may not exit the system 10 without saving and displaying the page number such that the bookmark is automatically entered upon exiting of the system 10 by the user. After the bookmark function has been performed by saving and displaying of the page number, the system 10 at step 290 may be shut-off after exiting the system 10 or moved to a constant state by waiting for the next prompt.

Of course, many options are available for performing functions of the system 10 based on the particular application. For example, mathematical problems may require entry of numbers or mathematical functions resulting in subsequent display of a particular problem on the display of the system 10. Furthermore, chemical applications may require entry of a particular formula by entry of a particular portion of the formula. When the portion of the formula is searched, the screen subsequently displays the entire formula for analysis and/or review thereof.

By way of example, and not limitation, examples of the invention will now be given.

EXAMPLE 1

An individual is reading a book in hard-copy form. The individual has inserted a corresponding disk of the book into the system of the present invention to assist in reading the book. The reader begins reading, and when the individual arrives at page 4, the individual encounters the word "pedagogy." The individual, not knowing the meaning of "pedagogy", inputs a "4" into the system using the keyboard of the system. The system displays the words stored on page 4 to the extent possible on its screen.

After the words on the page are displayed, the individual may scroll to the particular word in question using a track ball, cursor, mouse, or the like. In the alternative, the individual initially may enter the page number followed by the first three letters of the word, in this case, "ped". Following identification of the specific word, the definition of the word "pedagogy" as stored in memory as used in context of the book being read by the individual is displayed.

EXAMPLE 2

A student is reading his mathematics book in preparation for class. A disk is inserted into the system containing specific portions of the book as well as other information relating to the mathematics in the book. The student becomes perplexed when he is reading by a problem which arises in the book which the student cannot determine how to solve. (The problem is $(24+10+8-6) \div 2 = 18$ on page 7.) The student enters the page number on which the problem arises in the book, "7" The page may then be subsequently displayed to the student, and the student may then scroll to the particular problem using a cursor, track ball, mouse, or the like to identify the particular problem in question. In the alternative, a portion of the problem may be input, such as "(24", and the characters will be searched on the page and then displayed as a part of the whole problem in question. A solution of the problem and how the solution was arrived at will be displayed to the student by the system.

The student then may input a request for similar problems for practicing of the same. The similar problems are output to a printer so that a hard-copy of the practice problems may be provided as an exercise for the student.

EXAMPLE 3

A poem is being read by a person from a book containing a collection of poems from the same poet. A particular poem on page 43 of the book is being read by the person. A disk is inserted into the system of the present invention containing substantial portions of the words, phrases, passages and explanations of the same as used in the book. The person when reading the poem on page 43 identifies a phrase which, if read literally, is not comprehensible. The person, therefore, inputs the page number into the system, and the page containing the poem is displayed on the screen. The user may then scroll to the particular phrase in question, or, in the alternative, may input a portion of the phrase in question into the system. The system then identifies the particular word as well as the phrase in which the word is used. The meaning of the particular word may be displayed on the screen as well as the meaning and any secondary meanings intended by the poet of the phrase in which the word is used.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims and any equivalents thereof so as to encompass all such modifications and equivalent structures.

I claim:

1. A system for assisting understanding of a book being read by an individual comprising:

first electrical storage means interchangeably storing portions of the book for subsequent access;

second electrical storage means storing information relating to a page of the book;

input means inputting a page number of the book;

means for selecting a segment of the portion of the book after the inputting of the page number;

matching means electrically and operatively connected to the means for inputting, the first electrical storage means, the second electrical storage means and the means for selecting, the matching means searching the segment on the page number with the portions and the information in the first electrical storage means and the second electrical storage means, respectively, resulting in an identification; and output means outputting the identification, the means for outputting electrically connected to the matching means.

2. The system of claim 1 wherein the output means is a video display screen.

3. The system of claim 1 wherein the output means is a voice synthesizer.

4. The system of claim 1 wherein the input means includes voice recognition circuitry.

5. The system of claim 1 wherein the means for selecting is a track ball.

6. The system of claim 1 wherein the input means is a keyboard.

7. The system of claim 1 wherein the means for selecting is a touch screen.

8. The system of claim 1 wherein the output means comprises a printer.

9. The system of claim 1 wherein the identification is further supplemented with other information.

10. The system of claim 1 wherein the identification is a word in the book.

11. The system of claim 1 wherein the identification is a mathematical problem in the book.

12. The system of claim 1 further comprising:
marking means operatively connected to the matching means, the marking means electrically designating a point in the book for subsequent reference.

13. A method for providing a definition of a portion of a book being read by a user, the method comprising the steps of:
inputting an identifier corresponding to the portion of the book;
electrically storing definitions;
matching the input identifier with at least one of the electrically stored definitions; and
outputting the at least one matched definition.

14. The method of claim 13 further comprising the step of:
providing an indicator of the page in the book where the last matching occurred.

15. The method of claim 13 wherein the identifier is a page number and a portion of a word.

16. The method of claim 13 wherein the matching step further comprises the steps of:
searching an interchangeable memory corresponding to the book being read; and
searching a memory corresponding to subject matter of the book.

17. The method of claim 13 wherein the inputting is performed by a keyboard.

18. A system for assisting in reading a book by a user comprising:
a first electrical memory storing a compilation of words and/or phrases in the book, wherein the first memory is replaceable;
a second electrical memory storing other words exclusive of the words and/or phrases in the first memory;
an input means inputting a page number and portion of a searched word;
a processor operatively connected to the input means, the first electrical memory and the second electrical memory, the processor matching the page number and the portion of the searched word with a word stored in the first memory or the second memory; and
an output means operatively connected to the processor, the output means outputting at least a definition of the searched word.

19. The system of claim 18 wherein the output means further outputs alternate definitions of the searched word.

20. The system of claim 18 wherein the portion of the word is a portion of a mathematical problem.

21. The system of claim 20 wherein the output means further outputs similar problems to the mathematical problem in the book, 22. A pedagogical system for enhancing an individual's understanding of text in a book comprising:
a first electrical memory storing at least a substantial portion of the text of the book;
a second electrical memory storing other information relating to the text;
an input means inputting a page number of the book;
display means operatively connected to the input means, the display means displaying the portion of the book corresponding to the page number input; and
processing means including a selecting means and operatively connected to the first electrical memory, the second electrical memory, input means and the display means, the processing means identifying at least one segment of the displayed portion wherein the display means subsequently displays the other information from the second electrical memory corresponding to the identified segment.

23. The system of claim 22 wherein the other information in the second memory includes definitions of each of the segments as used in the text of the book.

24. The system of claim 22 wherein the processing means includes a cursor.

25. The system of claim 22 wherein the other information in the second memory includes exemplary mathematical problems relating to the specific segments.

26. The system of claim 22 further comprising:
a printer operatively connected to the processing means, the printer outputting the other information corresponding to the identified segment.

* * * * *